(12) United States Patent
Tazaki et al.

(10) Patent No.: US 9,213,929 B2
(45) Date of Patent: Dec. 15, 2015

(54) PATTERN PRINTED SHEET

(75) Inventors: Keiko Tazaki, Chiba (JP); Yuichi Miyazaki, Tokyo (JP); Satoko Maenishi, Saitama (JP); Runa Nakamura, Tokyo (JP); Toshio Yoshihara, Chiba (JP); Yuudai Yamashita, Saitama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 1396 days.

(21) Appl. No.: 11/753,654

(22) Filed: May 25, 2007

(65) Prior Publication Data

US 2007/0290047 A1 Dec. 20, 2007

(30) Foreign Application Priority Data

May 30, 2006 (JP) ................................ 2006/150121
Sep. 29, 2006 (JP) ................................ 2006/269220

(51) Int. Cl.
*G06K 19/06* (2006.01)
*G02F 1/1333* (2006.01)

(52) U.S. Cl.
CPC ...... *G06K 19/06037* (2013.01); *G02F 1/13338* (2013.01); *G02F 2201/343* (2013.01)

(58) Field of Classification Search
CPC ............................................... G02F 2201/343
See application file for complete search history.

(56) References Cited

U.S. PATENT DOCUMENTS

| | | | | |
|---|---|---|---|---|
| 2002/0191144 A1* | 12/2002 | Kashima et al. | ............... | 349/187 |
| 2003/0076468 A1* | 4/2003 | Ichihashi | ...................... | 349/115 |
| 2005/0280746 A1* | 12/2005 | North et al. | ..................... | 349/12 |
| 2006/0061724 A1* | 3/2006 | Chen et al. | .................... | 349/176 |

FOREIGN PATENT DOCUMENTS

JP            2003256137 A   *   9/2003   .............. G06F 3/033

* cited by examiner

*Primary Examiner* — Jessica M Merlin
(74) *Attorney, Agent, or Firm* — Fitch, Even, Tabin & Flannery, LLP

(57) ABSTRACT

The pattern printed sheet 1 of the present invention includes a substrate 2 and a non-visible light-reflective transparent pattern 3 printed on a surface of the substrate, wherein an ink for forming the transparent pattern 3 contains a non-visible light-reflective material capable of selectively reflecting a light having a wavelength in a non-visible light range, and the transparent pattern 3 printed on the surface of the substrate 2 has a multilayer structure in section which is repeated at predetermined intervals as observed by a scanning electron microscope, and reflects only a circular polarization component in a predetermined rotation direction relative to an incident light applied thereto. The pattern printed sheet is usable as a coordinate detecting means which is applicable a data input system of a type capable of directly hand-writing input data on an image screen of a display device, and has a reduced weight and a low price, and is readily obtained in the form of a large area sheet and can be mass-produced.

19 Claims, 3 Drawing Sheets

PATTERN PRINTED SHEET

FIELD OF THE INVENTION

The present invention relates to pattern printed sheets disposed on a front face of a medium for displaying various kinds of image information data to provide various contents associated with the image information. The pattern printed sheets provide a coordinate detecting means suitably applicable, in particular, to a data input system of a type capable of directly hand-writing input data on an image screen of a display device, and have a reduced weight and a low price and are readily obtained in the form of a large area sheet and can be mass-produced.

BACKGROUND OF THE INVENTION

In recent years, it has been strongly required to convert hand-written characters, pictures, symbols, etc., into electronic data capable of being treated by an information processing apparatus. In particular, there is an increasing demand for a system capable of inputting hand-written information data into computers, etc., at a real time without using any reading device such as a scanner.

To meet the above demands, there have been proposed, for example, write-type input devices including an input unit equipped with a pen and a writing plane for inputting data by hand-writing, an input locus reading unit for reading an input locus upon inputting the data by hand-writing using the input unit, an input locus conversion unit for converting the input locus information into electronic data, and an input locus data transmission unit for transmitting the electron data obtained by the input locus conversion unit to an information processing apparatus. In the above input devices, the input locus reading unit is capable of reading marks for providing a position information which are formed on the writing plane, by a sensor fitted to the pen. The writing plane is constituted from a special paper on which specific dot patterns capable of absorbing an infrared ray are printed as the marks for providing the position information, whereas the pen is provided with an infrared irradiation portion for irradiating an infrared ray to the writing plane, and an infrared sensor for detecting infrared patterns reflected from the dot patterns.

Also, there have been proposed write-type input devices of such a type which includes a writing panel and a pressure-sensitive sensor, an electrostatic sensor or an optical sensor disposed in the writing panel, and is capable of attaining an input locus by detecting a writing pressure, a static electricity or a shade when hand-writing input data on a surface of the writing panel using a stylus-type pen or fingers.

However, in the former input devices, although the hand-written contents (input locus) are converted into the electronic data, since the special paper is exclusively used as a direct inputting means, a separate display device is required to display the input locus information converted into the electronic data. Further, although the locus information is visually recognized by using the pen fitted with graphite or ink for recording the locus on the paper, the input devices are unsuitable for use in intuitive and interactive applications such as hand-writing input, for example, on a diagram or graph displayed on a display device, and also require a wider working space upon inputting. In addition, since the paper on which the locus is once recorded and inputted by hand-writing is not reusable, it is required to always reserve the inputting papers as expendable items. Therefore, the input devices are unsuitable, in particular, in mobile applications.

On the other hand, in the latter input devices including the writing panel and the pressure-sensitive sensor or electrostatic sensor disposed therein, reduction in size thereof is more difficult as compared to the former input devices, resulting in increase in weight and thickness of the devices as well as high production costs. In addition, the pressure-sensitive sensor or electrostatic sensor tends to suffer from errors when contacted with hands and cuffs. Therefore, the input devices are unsuitable for such ordinary writing procedures as used for writing on note books, etc., which are performed while contacting a side face of the little finger of a writer therewith. The input devices might be usable in intuitive and interactive applications such as hand-writing input, for example, on a diagram or graph displayed on a display device by fitting a writing panel made of a transparent material onto a front face of the display device or imparting a displaying function to the writing panel itself. However, in the input devices of this type, it is difficult to increase a size of an image screen of the display device owing to expensiveness thereof and reduce a size and weight of the devices. Therefore, the input devices are unsuitable for use in mobile applications such as cellular phones.

To solve these problems, there is a demand for input devices capable of inputting contents directly hand-written on an image screen of a display device into an information processing apparatus, which are compact in size and producible with low costs. To meet such a demand, for example, in the former write-type input devices, the paper having the printed dot pattern as the writing means which exhibits a transparency to a light in a visible range may be disposed on or ahead of a front face of the display device.

As the sheet satisfying these requirements, for example, JP 2003-256137A discloses the transparent sheet to be disposed on or ahead of a front face of a display device in which marks for providing a position information indicating a position of an input locus inputted by an electronic pen, etc., are printed with an ink capable of emitting a light readable by the input locus reading device when irradiating a light having a predetermined wavelength thereto. However, JP 2003-256137A fails to specify the kind of ink capable of realizing such a transparent sheet, etc., and therefore it is considered that JP 2003-256137A describes only an idea or a desire or wish for the transparent sheet without illustrating specific transparent sheets.

Further, JP 2001-243006A discloses a coordinate input device using a transparent member printed with a specific ink capable of reflecting a light in an infrared range. However, JP 2001-243006A also fails to specify the kind of ink capable of realizing such an input device, etc., and therefore it is considered that JP 2001-243006A describes only an idea or a desire or wish for the input device without illustrating specific transparent sheets.

SUMMARY OF THE INVENTION

The present invention has been made to solve the above conventional problems. An object of the present invention is to provide a pattern printed sheet suitably used for inputting an additional information to an image display medium, for example, for inputting data into a display device by directly hand-writing the data thereon, which has a reduced weight and a low price, and is readily obtained in the form of a large area sheet and can be mass-produced.

As a result of intensive and extensive researches to solve the above conventional problems, the inventors have found that the above object can be achieved by a irradiating a non-visible light such as typically an infrared ray to a sheet obtained by printing a pattern made of a transparent ink containing a liquid crystal material having a cholesteric structure, on a substrate, and utilizing a light reflected from the sheet. The present invention has been accomplished on the basis of the finding.

Thus, the present invention provides a pattern printed sheet comprising a substrate and a non-visible light-reflective transparent pattern printed with an ink on a surface of the substrate, wherein an ink for forming the transparent pattern contains a non-visible light-reflective material capable of selectively reflecting a light having a wavelength in a non-visible light range, and the transparent pattern has a multi-layer structure in section which is repeated at predetermined intervals as observed by a scanning electron microscope, and reflects only a circular polarization component in a predetermined rotation direction relative to an incident light applied thereto.

EFFECT OF THE INVENTION

In accordance with the present invention, there is provided a pattern printed sheet suitably used for inputting an additional information to an image display medium, for example, for inputting data concerning a position coordinate for handwriting information into a display device by directly handwriting the data thereon, which is free from disturbance of a visibility of the image display medium and capable of reducing a working space, as well as has a reduced weight and a low price, and is readily obtained in the form of a large area sheet and can be mass produced.

EXPLANATION OF REFERENCE NUMERALS

1: Pattern printed sheet; 2: Substrate; 3: Transparent pattern; 4: Orientation film (alignment layer); 5: Display device; 6: Input terminal (pen-type); 7: Read data processing device; 8: Cord; i: Non-visible light (incident light); r: Reflected light.

DETAILED DESCRIPTION OF THE INVENTION

Figure 1:
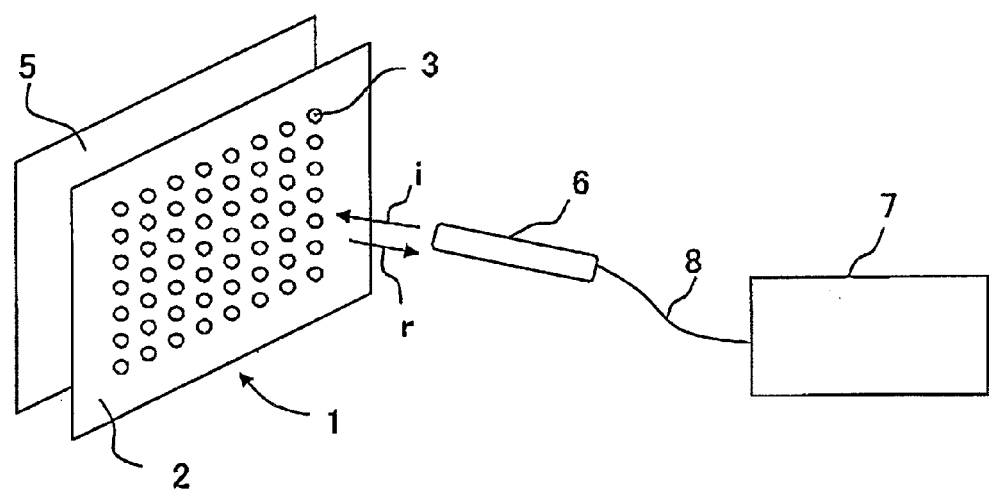
FIG. 1 is a schematic view showing a whole portion of a system using a pattern printed sheet according to the present invention.
Figure 2:
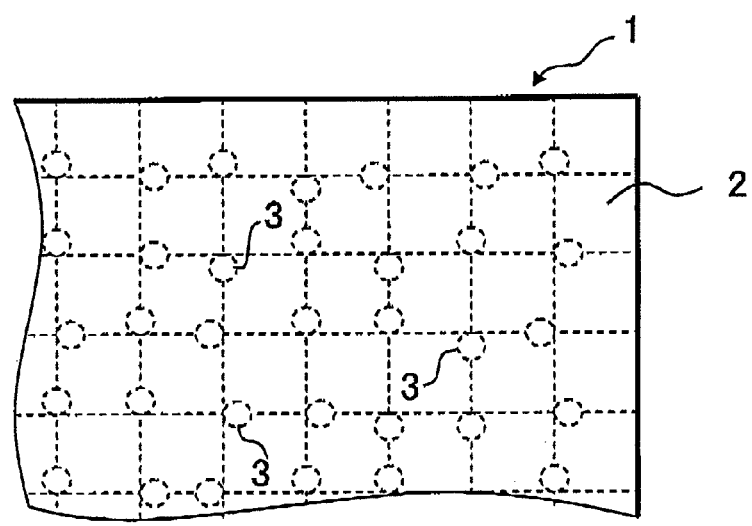
FIG. 2 is a an enlarged plan view of essential parts of a pattern printed sheet of the present invention which shows an example of a dot pattern irregularly arranged on the sheet.
Figure 3:
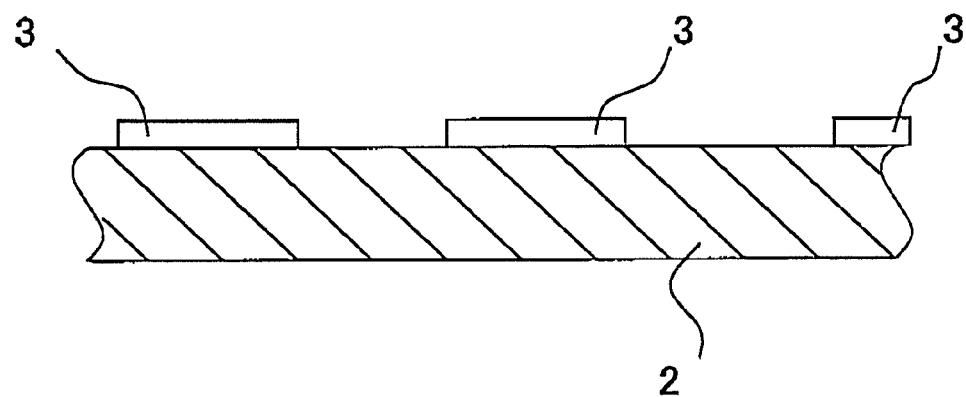
FIG. 3 is a sectional view showing an embodiment of a pattern printed sheet according to the present invention.

As shown in FIGS. 1 to 3, the pattern printed sheet 1 of the present invention includes a substrate 2 and a non-visible light-reflective transparent pattern 3 printed on a surface of the substrate 2. The ink for forming the transparent pattern 3 contains a non-visible light reflective material which exhibits a selective reflection to a wavelength in a non-visible light range. The non-visible light reflective transparent pattern 3 formed on the surface of the substrate 2 has a multilayer structure in section which is repeated at predetermined intervals as observed by a scanning electron microscope (SEM), and reflects only a circular polarization component in a predetermined rotation direction relative to an incident light applied thereto.

The non-visible light is preferably an infrared ray or an ultraviolet ray. The infrared ray is preferably a near-infrared ray having a wavelength of from 800 to 2500 nm and more preferably an infrared ray having a peak selective reflection wavelength in the range of from 800 to 950 nm. The ultraviolet ray is preferably an ultraviolet ray having a peak selective reflection wavelength in the range of from 200 to 400 nm.

The ink component forming the non-visible light reflective transparent pattern (hereinafter referred to merely as the "transparent pattern") used in the present invention, is not particularly limited as long as the ink component can reflect a non-visible light, and the transparent pattern formed therefrom has a multilayer structure which is repeated at predetermined intervals when observing a section thereof by a scanning electron microscope (SEM), and reflects only a circular polarization component in a predetermined rotation direction relative to an incident light applied thereto. The multilayer structure is preferably formed from a liquid crystal material having a fixed cholesteric structure.

The liquid crystal having a cholesteric (chiral nematic) structure exhibits a helical structure (cholesteric structure) which is repeated at predetermined intervals. The cholesteric structure is characterized by a property of reflecting a circularly polarized light having a wavelength corresponding to helical direction and helical pitch thereof (selective reflection). The selective reflection wavelength $\lambda$ (nm) is generally given by the following formula:

$$\lambda = p \cdot n \cdot \cos\theta$$

wherein p is a helical pitch (nm) of the cholesteric liquid crystal; n is an average refractive index of the liquid crystal; and $\theta$ is an incident angle of light (angle from a line normal to a plane).

Figure 5:
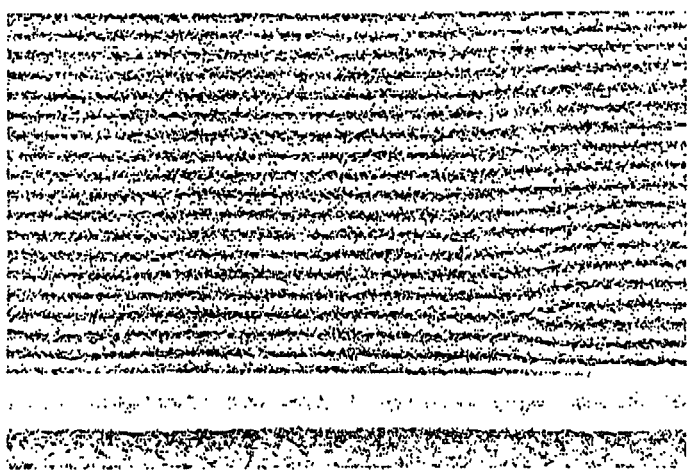
FIG. 5 is a scanning electron microphotograph showing a repeated layer structure of a cholesteric liquid crystal.

One pitch of the cholesteric structure means a length of an as around which an elongated liquid crystal molecule is spirally rotated by 360°. However, when actually observing a section of the structure, a repeated layer structure appears every 180° when the liquid crystal molecule is rotated (refer to FIG. 5). Therefore, an apparent pitch between layers when observing a section of the structure is one-second (½) of a helical pitch of the liquid crystal. Thus, when the apparent pitch between layers when observing a section of the structure is 250 nm, the helical pitch of the liquid crystal is 500 nm.

Meanwhile, when utilizing the property of reflecting only a circularly polarized light in the desired rotation direction, the SN ratio between a light reflected from the non-visible light reflective transparent pattern and a background light (light reflected from portions other than the pattern) can be improved by suitably combining with a circular polarization filter, etc.

Next, the liquid crystal material having a cholesteric structure applicable to the pattern printed sheet of the present invention is described.

Examples of the liquid crystal material exhibiting a cholesteric liquid crystal phase which may be used in the present invention include a polymerizable chiral nematic liquid crystal material (polymerizable liquid crystal material) prepared by mixing a polymerizable nematic liquid crystal with a polymerizable chiral agent, and a polymeric cholesteric liquid crystal material.

In the present invention, among these polymerizable liquid crystal materials, preferred are polymerizable monomers or a polymerizable oligomers, and more preferred are those having an acrylate structure as a polymerizable functional group.

Meanwhile, the above liquid crystal materials having (exhibiting) the cholesteric structure are not necessarily required to have a high transparency to a light having a wavelength in a visible range as long as they exhibit a high reflectance (usually from about 5 to about 50%) to a non-visible light, for example, a light having a wavelength in at least a part of an infrared range. This is because even if the above liquid crystal materials having a cholesteric structure are completely opaque, the transparent pattern can exhibits a desired transparency as a whole by adequately increasing an area of its portion where no liquid crystal material is provided (marginal portion) and utilizing a light transmitted therethrough. However, the liquid crystal materials themselves preferably have a high visible light transmittance. The liquid crystal materials having such a cholesteric structure usually have a light transmittance of about 70% or higher in a visible light range when a thickness thereof is about several μm and a high reflection wavelength range is controlled to an infrared range. On the other hand, the liquid crystal materials generally have a reflectance as high as from about 5 to about 50% to a light in an infrared range. The temperature range in which the above polymeric liquid crystal materials exhibit a cholesteric phase is not particularly limited as long as they are fixed in a cholesteric phase state by crosslinking, etc. The liquid crystal materials exhibiting a cholesteric phase in the temperature range of from 30 to 140° C. are preferred because the dig step upon printing the pattern and phase transition of the liquid crystal can be conducted at the same time.

The above liquid crystal materials can be optically fixed while keeping a cholesteric liquid crystal condition of a liquid crystal molecule thereof, can be formed into a sheet easily handled, and is capable of producing a pattern which is stable at an ordinary temperature.

Further, there may also be used liquid crystal polymers (polymeric cholesteric liquid crystals) having a high glass transition point which is capable of being fixed in a glass state at an ordinary temperature by heating and then cooling. These liquid crystal polymers can also be optically fixed while keeping a liquid crystal molecule thereof in a liquid crystal state having a cholesteric regularity, and can be formed into an optical sheet easily handled, and further is capable of producing a pattern which is stable at an ordinary temperature.

As the polymerizable monomers, there may be used a mixture of a liquid crystal monomer and a chiral compound as described in JP 7-258638A, JP 11-513019A, JP 9-506088A and JP 10-508882A. For example, a chiral nematic liquid crystal (cholesteric liquid crystal) is obtained by mixing a liquid crystal monomer exhibiting a nematic liquid crystal phase with a chiral agent. Meanwhile, the method of forming the cholesteric liquid crystal into a film is also described in JP 2001-5684A or J? 2001-110045A.

Examples of the nematic liquid crystal molecules (liquid crystal monomers) usable in the present invention include those compounds represented by the following formulae (1) to (11). These illustrated compounds have an acrylate structure and are capable of being polymerized by irradiating an ultraviolet ray, etc., thereto.

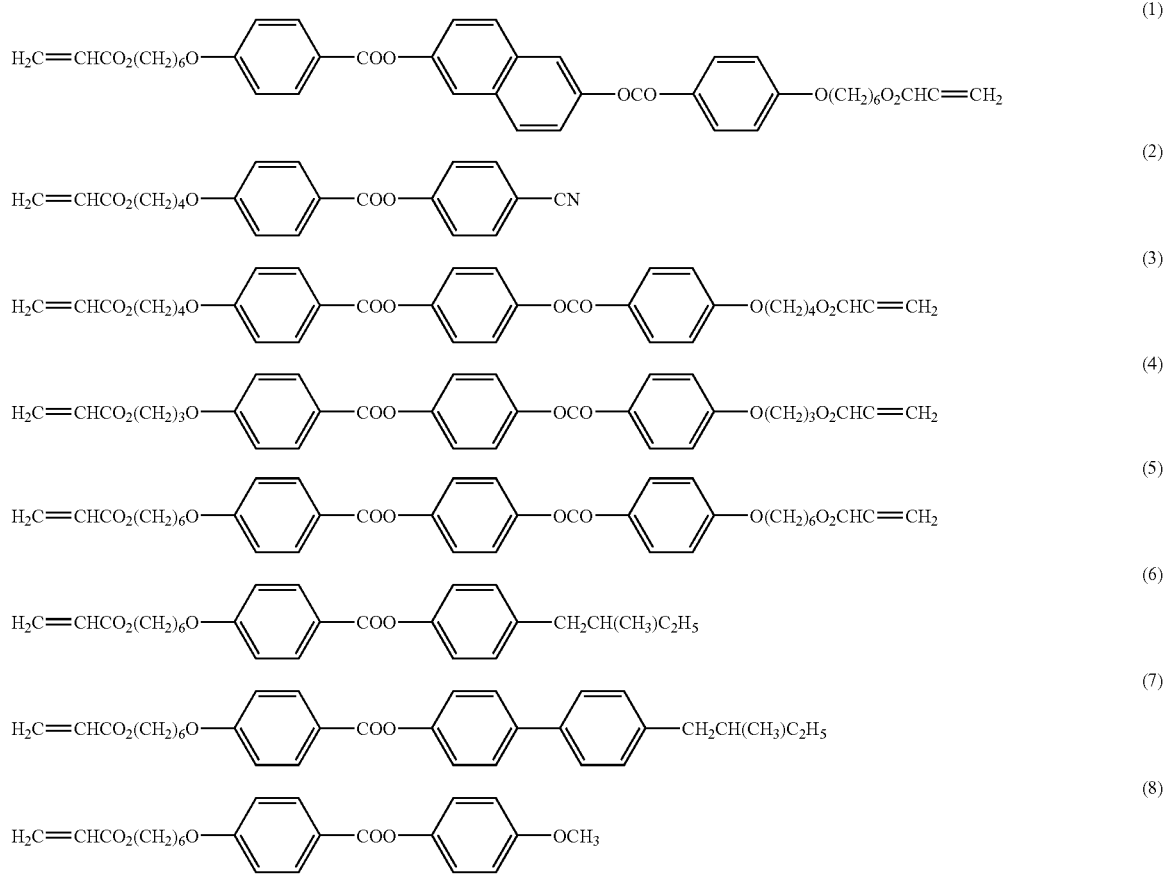

-continued

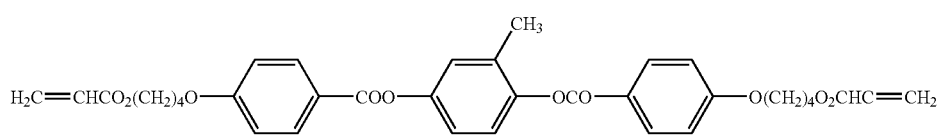
(9)

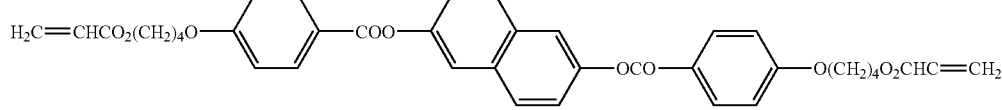
(10)

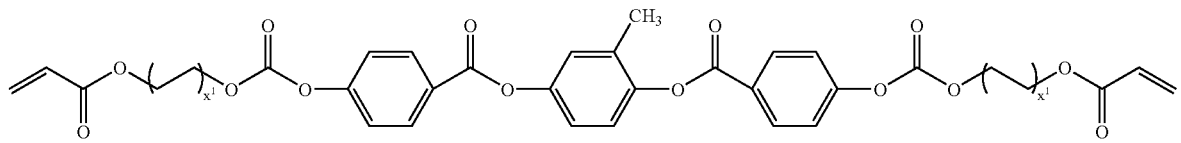
(11)

In the compounds of the formula (11), $X^1$ is a number (integer) of from 2 to 5.

In addition, as the above polymerizable oligomers, there may be used cyclic organopolysiloxane compounds having a cholesteric phase as described in JP 57-165480A, etc.

Further, as the above liquid crystal polymer, there may be used polymers containing a mesogen group exhibiting a liquid crystal property which is introduced into a main chain, a side chain or both thereof, polymeric cholesteric liquid crystals containing a cholesteryl group introduced into a side chain thereof, liquid crystal polymers as described in JP 9-133810A, liquid crystal polymers as described in JP 11-293252A, etc.

The chiral agent contained in the transparent ink used in the present invention is a material containing asymmetric carbon atoms which is capable of forming a chiral nematic phase when mixed with a nematic liquid crystal. The chiral agent is not particularly limited as long as it has a polymerizability. The preferred chiral agents include such compounds having an acrylate structure as represented by the following formula (12), since they are polymerizable upon irradiating an ultraviolet ray thereto.

lesteric structure contained in the pattern. When using the liquid crystal material containing both a nematic liquid crystal and a chiral agent, the pitch length may be controlled by adjusting an amount of the chiral agent added. The amount of the chiral agent added for obtaining the aimed peak selective reflection wavelength in a non-visible light range varies depending upon kind of liquid crystal used and kind of chiral agent used. For example, when using the liquid crystal represented by the formula (11) and the chiral agent represented by the formula (12), the chiral agent is added in an amount of about 3 parts by weight on the basis of 100 parts by weight of the liquid crystal to form a cholesteric phase exhibiting a peak reflection in an infrared range. When using a polymeric cholesteric liquid crystal as the liquid crystal material, the polymer materials having the aimed pitch length may be selectively used.

The polymer of the nematic liquid crystal molecule and the chiral agent used in the present invention may be produced, for example, by adding a known photopolymerization initiator, etc., to the polymerizable nematic liquid crystal and the polymerizable chiral agent, and irradiating an ultraviolet ray thereto to subject these components to radical polymerization reaction.

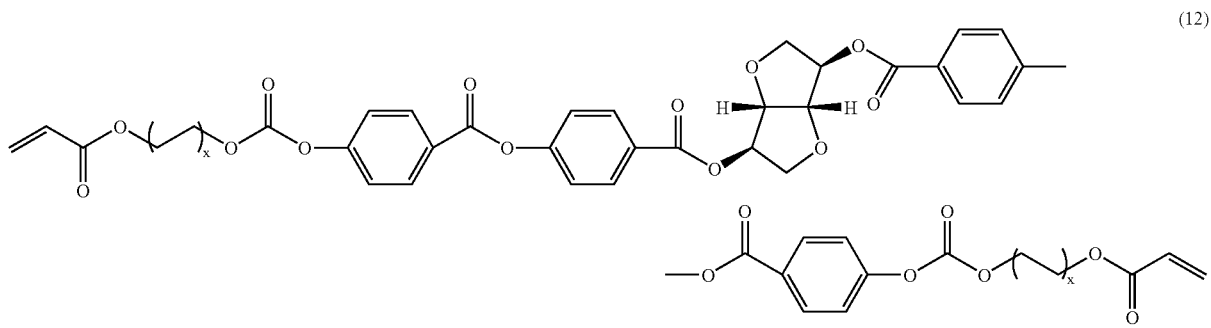
(12)

wherein X is a number (integer) of from 2 to 5.

The non-visible light reflecting property of the transparent pattern used in the present invention is preferably attained by utilizing a wavelength selective reflection (same principle as that of Bragg reflection in X-ray diffraction) of a liquid crystal material having a cholesteric structure. The peak selective reflection wavelength (wavelength satisfying Bragg reflection conditions) is determined by a pitch length of the cho- In addition, in the present invention, a coating solution prepared by dissolving the polymerizable monomer or the polymerizable oligomer, or the chiral agent, in a solvent is preferably used upon printing the transparent pattern.

The solvent is not particularly limited as long as it exhibits a sufficient ability of dissolving these materials therein, and there may be used any suitable known solvents. Examples of the solvent include ordinary solvents such as anone (cyclohexanone), cyclopentanone, toluene, acetone, MEK (methyl ethyl ketone), MIBK (methyl isobutyl ketone), DMF (N,N-dimethylformamide), DMA (N,N-dimethylacetamide), methyl acetate, ethyl acetate, n-butyl acetate and 3-methoxybutyl acetate, and mixed solvents thereof.

In the pattern printed sheet of the present invention, the transparent pattern may be printed by known methods without any particular limitations. Examples of the printing method include a flexographic printing method, a gravure printing method, a stencil printing method and an ink-jet printing method.

The pattern printed sheet 1 of the present invention is disposed in combination with or integrally with various image display media in order to provide various supplementary information data (such as position coordinates) for images displayed. The image display media include those capable of displaying various types of image information data. The image information to be displayed may be in the form of either a static image or an animation. Examples of the kind of information include characters, numerals, figures, codes such as bar codes, photographic images (such as sights, portraits, pictures and others), etc. Specific examples of the image display medium 5 include display devices such as CRT (cathode ray tube), LCD (liquid crystal display), PDP (plasma display) and EL (electroluminescence), and books, pamphlets, catalogues, slips and manuals made of image-printed papers and resin films, etc. The applications and configurations of the image display media fitted with the pattern printed sheet may include various ones as described hereinunder (such as cellular phones). Among these applications and configurations, a typical one is such an application in which the pattern printed sheet is disposed opposite to a front face of the display device such as CRT to provide an information concerning a position coordinate of an image inputted by hand-writing on an image screen thereof. Further, the pattern printed sheet 1 of the present invention may be incorporated, for example, into a part of a polarizing plate used as a front film for liquid crystal displays.

Next, the applications of the pattern printed sheet 1 of the present invention are described in detail. As shown in FIG. 1, a pattern reflected from the pattern printed sheet 1 is read out by means of the input terminal 6 capable of irradiating and detecting a non-visible light to thereby provide an information concerning a position of the input terminal on the sheet 1.

The pattern printed sheet 1 is preferably fitted to the display device 5 capable of displaying an image in an opposed relation to a front face of the display device.

Meanwhile, when fitted in an opposed relation to the front face of the display device, the sheet 1 may be disposed either in close contact therewith without spacing or spaced apart therefrom.

In the pattern printed sheet of the present invention, the transparent pattern may be formed such that the position information of the input terminal on the sheet is determined from the partial pattern read out by the input terminal equipped with a sensor.

Some of such a pattern are also illustrated in JP 2003-256137A and JP 2001-243006A. Examples of the pattern include patterned combination of dots having a plurality of shapes different from each other which are arranged in a predetermined range in a plane, patterned combination of crossed portions of ruled lines having different sizes from each other which extend in the vertical and horizontal directions and are respectively arranged in a predetermined range, patterns formed by directly associating values of x and y coordinates with vertical and horizontal sizes of dots, etc. Among them, in order to provide an especially simple and suitable pattern, there may be used the method of arranging dots in right-left and up-down offset relation to reference points set in a equidistant relation to each other in the vertical and horizontal directions to utilize a relative position of the respective dots from the reference points. This method is useful for attaining a high resolution of the input device because dots having a smaller constant size are usable therein.

In the pattern printed sheet of the present invention, in order to detect the pattern reflected therefrom by a non-visible light sensor fitted to the input terminal, the non-visible light reflectance of the sheet as measured at a peak selective reflection wavelength is preferably large. The non-visible light reflectance of the pattern printed sheet as measured at a peak selective reflection wavelength is usually from about 5 to about 50% and preferably 20% or more. Meanwhile, since the cholesteric structure has a property of reflecting only a circularly polarized light in the same direction as the cholesteric helical direction, the non-visible light reflectance of the cholesteric structure reaches only about 50% at most.

Upon the reflection on the cholesteric structure, in general, the larger the thickness of a printed layer thereof, the higher the reflected light intensity becomes. However, when the thickness of the printed layer is too large, there tend to occur problems such as disturbed orientation and deteriorated transparency of the liquid crystal as well as increased load upon drying. Therefore, the thickness of the printed layer of the non-visible light reflective pattern is usually from about 1 to about 20 µm and preferably from about 3 to about 10 µm.

When the printed pattern is in the form of a dot pattern, the shape of the respective dots is not particularly limited as long a tile dots are readily distinguished from adjacent ones. The shape of the dots is usually a circular shape, an elliptical shape, a polygonal shape, etc., as viewed in a plan thereof. In addition, the steric shape of the dots is not particularly limited, and is usually a disk shape or may also be a semi-spherical shape or a concave shape.

The substrate used in the pattern printed sheet of the present invention may be either transparent or opaque, and may be appropriately used in the form of a so-called film, sheet or plate.

Examples of the suitable material for the transparent substrate include glass, TAC (triacetyl cellulose), PET (polyethylene terephthalate), polycarbonates, polyvinyl chloride, acrylic resins and polyolefins. The thickness of the transparent substrate may be appropriately selected from the range of from about 20 to about 5000 µm depending upon materials, properties required and configurations upon use.

When the transparent substrate is made of those materials which are readily dissolved or swelled in a solvent, e.g., polymer films such as TAC films, a barrier layer is preferably formed on the substrate so as to prevent the substrate from being corroded or damaged by the solvent contained in the coating solution used upon printing the transparent pattern. In this case, the barrier layer may also has a function of the orientation film (alignment layer). For example, as the material for the barrier layer, there may be used water-soluble materials such as PVA (polyvinyl alcohol) and HEC (hydroxyethyl cellulose).

Examples of the opaque substrate include papers, cloths, dye- or pigment-added plastic materials and metal plates.

Figure 4:
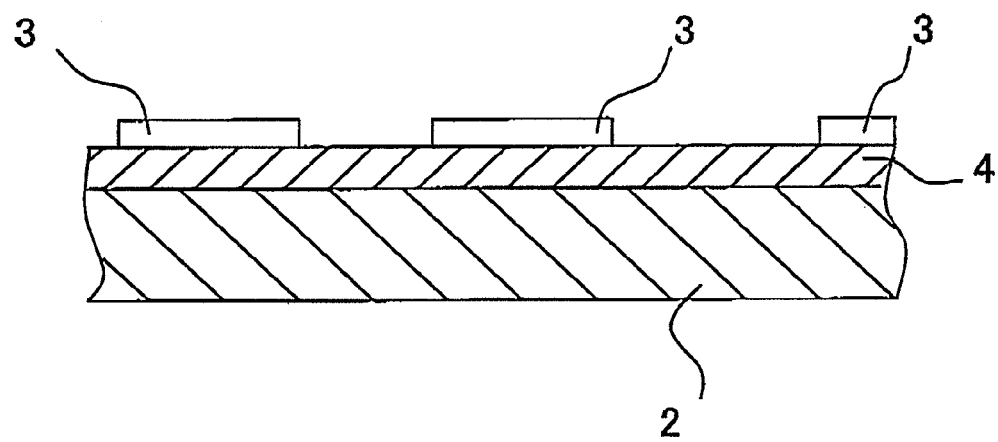
FIG. 4 is a sectional view showing another embodiment of a pattern printed sheet according to the present invention.

In the pattern printed sheet of the present invention, if required, in order to stabilize orientation of liquid crystal when using the liquid crystal material, the orientation film (alignment layer) 4 is preferably formed on the substrate 2 refer to FIG. 4). The material for the orientation film is not particularly limited. Examples of the material for the orientation film include known materials for the orientation film such as PI (polyamides), PVA, HEC, PC (polycarbonates), PS (polystyrene), PMMA (polymethyl methacrylate), PE (polyesters), PVCi (polyvinyl cinnamate), PVK (polyvinyl carbazole) and cinnamoyl-containing polysilanes, coumarin and chalcone. The orientation film made of these materials may be subjected to rubbing treatment. Also, a stretched resin sheet as the orientation film may be bonded onto the substrate.

Further, in the pattern printed sheet of the present invention, in order to impart thereto a sufficient strength capable of withstanding repeated contact with the input terminal upon inputting by hand-writing using the pen-type input terminal, etc., a hard coat layer (surface protective layer made of a hard coating film) may be formed on the substrate. The material for the hard coat layer is not particularly limited, and there may be used those ordinarily used in the fields of sheets or lenses. Typical examples of the material for the hard coat layer include acrylic resins and silicon-based resins which are crosslinked and cured by irradiation with an ultraviolet ray, an electron beam, heat, etc.

Further, when the display device is disposed on a back side of the pattern printed sheet of the present invention, in order to ensure a visibility of the display device, an anti-reflection film may be provided on or within the sheet. The material for the anti-reflection film is not particularly limited, and the anti-reflection film may be made of those materials ordinarily used in the fields of transparent sheets and lenses for displays. Typical examples of the material for the anti-reflection film include dielectric laminated films obtained by laminating a thin film made of low-refractive index substances such as magnesium fluoride and fluorine-containing resins and a thin film made of high-refractive index substances such as zirconium oxide and titanium oxide on each other such that the low-refractive index thin film is disposed as an outermost layer.

The display device may be connected to an information processing apparatus for processing data inputted by hand-writing, or may be independently installed. The display device of the former type is preferably used because the locus upon inputting data by hand-writing is displayed on an image screen thereof, thereby enabling intuitive inputting of the data.

Examples of the information processing apparatus for dealing with the data inputted by hand-writing include various portable terminal equipments such as cellular phones and PDA, personal computers, visual telephones, televisions with mutual transmission functions, and internet terminal equipments.

The input terminal 6 used in the present invention is not particularly limited as long as it can emit a non-visible light i and detect a reflected light r from the pattern as shown in FIG. 1, and any known sensors may be used as the input terminal. For example, JP 2003-256187A discloses such an input terminal 6 of a pen type which is connected to the read data processing device 7. Further, a pen point without ink, graphite, etc., CMOS camera with a non-visible light irradiating portion, a processor, a memory, a transmission interface such as a wireless transceiver utilizing Bluetooth technique, a battery, etc., may be accommodated in the input terminal.

In the operation of the pen-type input terminal 6, for example, when the pen point is contacted with a front surface of the sheet 1 provided thereon with the printed dot pattern as shown in FIG. 2 when viewed in a plan thereof to draw desired information data on the surface of the sheet in a tracing manner, a writing pressure applied to the pen point is detected by the pen-type input terminal 6, and the CMOS camera is operated to irradiate a non-visible light having a predetermined wavelength toward a given area in the vicinity of the pen point from the non-visible light irradiating portion thereof and take a photograph of the pattern irradiated with a non-visible light (photographing of the pattern is conducted, for example, from about several ten times to about one hundred times for one second). When using the pen-type input terminal 6 coupled with the read data processing device 7, the photographed pattern was analyzed by the processor to convert the locus inputted in association with movement of the pen point upon hand-writing into numerical data as input locus data which are then transmitted to the information processing apparatus.

Meanwhile, the members such as processor, memory, transmission interface such as a wireless transceiver utilizing Bluetooth technique, battery, etc., may be fitted on an outside of the pen-type input terminal 6 and accommodated within the read data processing device 7 as shown in FIG. 1. In this case, the pen-type input terminal 6 may be connected to the read data processing device 7 through a cord 8, or the read data obtained by the pen-type input terminal 6 may be transmitted to the read data processing device 7 using a radio wave, a non-visible light, etc., in a wireless manner.

In addition, the input terminal 6 may be constituted from a reader as described in JP 2001-243006A.

The read data processing device 7 used in the present invention is not particularly limited as long as the device has functions of computing a position information from the continuously photographed data read out by the input terminal 6 and combining the computed data with time information to provide input locus data capable of being treated by the information processing apparatus, and may be provided therein with the members such as processor, memory, transmission interface and battery.

Further, the read data processing device 7 may be accommodated within the input terminal 6 as described in JP 2003-256137A, or within an information processing apparatus equipped with a display device. Also, the read data processing device 7 may be connected to the information processing apparatus equipped with the display device either in a wireless manner or through a cord, etc., to transmit the position information thereto.

In the information processing apparatus connected to the display device 5, the image to be displayed on the display device 5 is sequentially updated on the basis of the locus data transmitted from the read data processing device 7 so that the locus inputted by hand-writing at the input terminal 6 can be displayed on the display device as if the locus is written on a paper by a pen.

Thus, the pattern printed sheet of the present invention can be directly fitted to the existing display devices, and therefore can be produced in a simple manner as compared to conventional electrostatic or pressure-sensitive type position input devices built-in or accommodated in the display devices, resulting in reduction in production costs. Also, even when the printed pattern capable of providing a position information becomes blurred or damaged and is therefore deteriorated in the function of providing the position information, it is necessary to replace only the sheet with new one, resulting in facilitated handling thereof by users.

The pattern printed sheet of the present invention may also be used as a protective sheet for liquid crystal by fitting the sheet to a liquid crystal display. In addition to the above case where the sheet is fitted to a front face of the display device, the pattern printed sheet of the present invention can also be used in other applications, for example, the sheet may be used by placing it on a paper document such as a request for inspection (refer to JP 2004-341831A).

The pattern printed sheet of the present invention may be fitted detachably on or ahead of a front face of the display device. With such a detachable arrangement, the pattern printed sheet of the present invention may be fitted to not only one specific display device but also other display devices. Also, the pattern printed sheet of the present invention by itself is preferably provided thereon with a fitting means to the display device in order to enable the sheet to be fitted to the display device without need of any working on the side of the display device. Meanwhile, the fitting means may be formed integrally with the sheet or provided in the form of a separate member.

As such a fitting means, there may be used, for example, buckle-shaped members capable of being hooked to corner portions of the display device, clips for grasping an end portion of the display device, etc. In the preferred simple embodiment where the sheet is fitted to the front face of the display device, the fitting means may be in the form of an attaching member having a bonding property and an adhesion property which may be provided on a display-contact surface of the sheet. Examples of the attaching member include a bonding member or an adhesive member formed integrally with the sheet, or an bonding agent or an adhesive directly applied onto the contact surface of the sheet.

The pattern printed sheet of the present invention is produced in the form of a separable sheet to enhance convenience and utilization of the product. More specifically, the pattern printed sheet may be in the form of a sheet which is separable by using an ordinary cutting device such as scissors or a special cutting device, or a perforated sheet which is separable with hands, etc. The pattern printed sheet in the form of such a separable sheet can be cut into a desired size corresponding to that of a display device owned by the respective users, so that the makers might produce only several kinds of sheets having predetermined sizes. Further, the pattern printed sheet may be perforated such that the perforation corresponds to a standard size of generally used display devices.

In addition, when using the pattern printed sheet in the above manner, i.e., in the form of a separable sheet, one sheet on which the coordinate pattern providing a position information is printed can be separated and divided into individual sheets showing different coordinate ranges from each other. In the case where the sheets thus separated are respectively fitted to, for example, the adjacent display devices such that the coordinate patterns thereof are arranged in a continuous (in series) relation to each other, the data inputted from these display devices can have a suitable continuity. Further, when a plurality of sheets having different coordinate ranges from each other are fitted to one input device while changing-over the sheets one by one, the respective sheets can be used with different meanings and functions from each other.

EXAMPLES

The present invention will be described in more detail by referring to the following examples. However, it should be noted that these examples are only illustrative and not intended to limit the invention thereto.

Example 1

One hundred parts by weight of a monomer containing polymerizable acrylates at both terminal ends thereof, mesogen at a center thereof and spacers between the respective acrylates and the mesogen and having a nematic-isotropic transition temperature of near 110° C. (compound having a molecular structure represented by the formula (11)) and 3.3 parts by weight of a chiral agent containing polymerizable acryloyl groups at both terminal ends thereof (compound having a molecular structure represented by the formula (12)) were dissolved in anone to prepare a cyclohexane solution thereof (hereinafter referred to merely as the "anone solution"). Meanwhile, the anone solution was further mixed with 4 parts by weight of a photopolymerization initiator "RUSILIN (registered trademark) TPO" available from BASF Japan Co., Ltd.

On the other hand, a solution prepared by dissolving a polyimide "OPTOMER (registered trademark) AL1254" available from JSR Co., Ltd., in a solvent was applied onto a 0.7 mm-thick transparent glass plate using a spin coater, dried at 200° C. to form a coating film having a thickness of 0.1 µm, and then subjected to rubbing treatment, thereby obtaining an orientation film (alignment layer).

On the thus obtained orientation film-coated glass substrate, a dot pattern and a rectangular pattern for measuring a reflectance were printed with an ink composed of the above anone solution by a flexographic printing method. Next, the thus printed patterns were heated and dried to simultaneously allow a cholesteric phase transition of the liquid crystal to proceed.

Then, the thus formed printed patterns were irradiated with an ultraviolet ray to crosslink and polymerize the monomer molecule with the acryloyl group of the chiral agent by radicals generated from the photopolymerization initiator contained in the coating film, thereby producing a transparent sheet in which disk-shaped transparent dot patterns were two-dimensionally arranged in a rectangular region such that the respective dots were offset by a predetermined coordinate distance from square lattice points as shown in the plan view of FIG. 2, and the rectangular patterns (not shown) for measuring a reflectance were formed in a marginal portion out of the rectangular region. The thus produced patterns had a thickness of about 2 µm, and the respective dots of a disk shape had a diameter of about 100 µm.

The reflectance of the rectangular pattern (solid coating portion) for measuring a reflectance in the resultant transparent sheet was measured using a spectrophotometer (incident angle: 5°) available from Shimadzu Corp. As a result, it was confirmed that the selective reflection wavelength of the coating film was from 830 to 880 nm, and the reflectance of the coating film was 20%.

Further, as a result of observing a section of the resultant patterns by SEM, it was confirmed that the layer structure was formed at predetermined intervals. Then, an infrared ray was irradiated to the sheet sample, and the reflected light therefrom was successively passed through a ¼ wavelength plate and a linear polarizing plate, and then while observing by an infrared camera, the ¼ wavelength plate was rotated within a plane. As a result, it was confirmed that only a lightness of the pattern portions varied periodically, and the patterns had such a property of reflecting only a circular polarization component in the specific rotation direction relative to the incident light. Meanwhile, the helical pitch was 525 nm.

Example 2

A solution prepared by dissolving hydroxyethyl cellulose (HEC) in pure water such that the concentration thereof was 2% by weight, was applied onto a 80 µm-thick transparent TAC film (previously subjected to saponification treatment) using a bar coater, dried at 100° C. to form a coating film having a thickness of 0.2 µm, thereby producing a transparent substrate with an orientation film (alignment layer).

On the thus obtained substrate, a dot pattern and a rectangular pattern for measuring a reflectance were printed with an ink composed of the above anone solution obtained in Example 1 by a gravure printing method. The thus obtained patterns were subjected to drying (phase transition) treatment and curing treatment in the same manner as in Example 1, thereby obtaining a transparent sheet provided thereon with the transparent disk-shaped dot pattern and the rectangular pattern for measuring a reflectance. The thus produced patterns had a thickness of about 5 μm, and the respective dots of a disk shape had a diameter of about 100 μm.

The reflectance of the rectangular pattern (solid coating portion) for measuring a reflectance in the resultant transparent sheet was measured using a spectrophotometer (incident angle: 5°) available from Shimadzu Corp. As a result, it was confirmed that the selective reflection wavelength of the coating film was from 830 to 880 nm, and the reflectance of the coating film was 13%.

Further, as a result of observing a section of the resultant patterns by SEM, it was confirmed that the layer structure was formed at predetermined intervals. Then, an infrared ray was irradiated to the sheet sample, and the reflected light therefrom was successively passed through a ¼ wavelength plate and a linear polarizing plate, and then while observing by an infrared camera, the ¼ wavelength plate was rotated within a plane. As a result, it was confirmed that only a lightness of the pattern portions varied periodically, and the patterns had such a property of reflecting only a circular polarization component in the specific rotation direction relative to the incident light. Meanwhile, the helical pitch was 525 nm.

Industrial Applicability

As described in detail above, the pattern printed sheet of the present invention is a member capable of providing a coordinate detection means which is applicable to a data input system for providing an additional information to an image display medium, for example, the system of such a type for inputting data to a display device by directly hand-writing the data on the sheet. The pattern printed sheet serves for reducing a working space, has a reduced weight and low price, and is readily obtained in the form of a large area sheet and can be mass-produced. For this reason, the pattern printed sheet is easily handled and has a high utility, and can be used in various portable terminal equipments such as cellular phones and PDA, and various information processing apparatuses such as personal computers, visual telephones, televisions with mutual transmission functions, and internet terminal equipments.

What is claimed is:

1. A pattern printed sheet comprising a substrate and a non-visible light-reflective transparent pattern printed on a surface of the substrate, wherein an ink for forming the transparent pattern contains a non-visible light-reflective material capable of selectively reflecting a light having a wavelength in a non-visible light range, a non-visible light reflectance of the transparent pattern as measured at a peak selective reflection wavelength being 13 to 50%, and the transparent pattern has a dot pattern, and has a multilayer structure in section which is repeated at predetermined intervals and, when observing a section of the structure, a repeated layer structure appears every 180° when the liquid crystal molecule is rotated, as observed by a scanning electron microscope, and reflects only a circular polarization component in a predetermined rotation direction relative to an incident light applied thereto, wherein the multilayer structure is formed from a liquid crystal material having a fixed cholesteric structure, wherein the liquid crystal material having a fixed cholesteric structure is made of a chiral nematic liquid crystal material formed by mixing a nematic liquid crystal with a chiral agent, wherein the nematic liquid crystal is in the form of a compound having an acrylate structure, the non-visible light reflectance being attained by the liquid crystal material having the fixed cholesteric structure, wherein the transparent pattern printed has a thickness of from 1 to 20 μm, and wherein the nematic liquid crystal includes a compound represented by a formula selected from the group consisting of the following formulae (1), (2), (4)-(9), and (11):

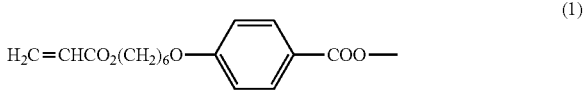

(1)

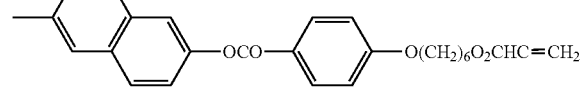

(2)

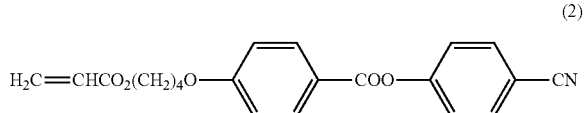

(4)

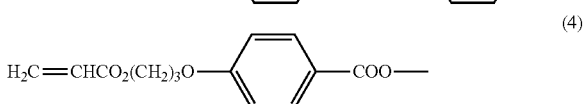

(5)

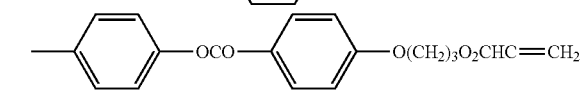

(6)

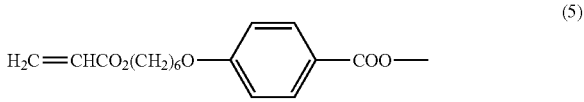

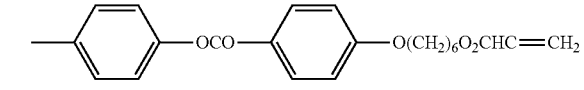

(7)

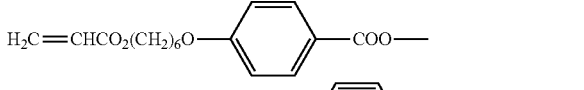

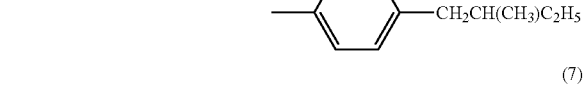

(8)

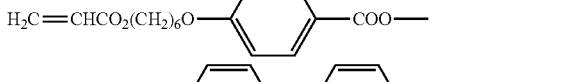

(9)

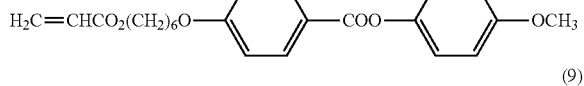

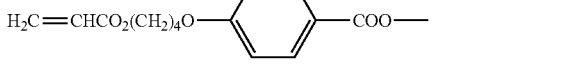

-continued

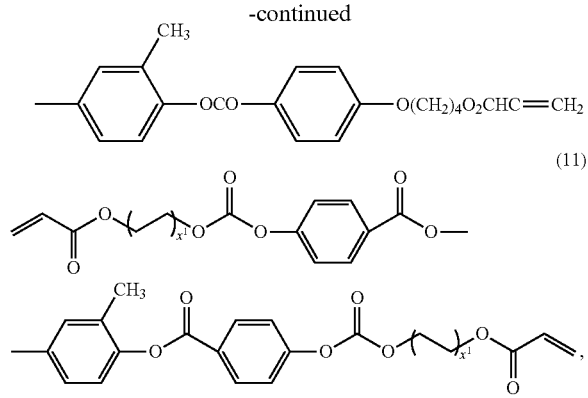

wherein in formula (11), $X^1$ is a number from 2 to 5.

2. The pattern printed sheet according to claim 1, wherein the nematic liquid crystal and the chiral agent contain respective crosslinkable functional groups which are crosslinked with each other to form the fixed cholesteric structure.

3. The pattern printed sheet according to claim 1, wherein an orientation film is disposed between the substrate and the transparent pattern.

4. The pattern printed sheet according to claim 1, wherein the transparent pattern has a peak selective reflection wavelength in the range of from 800 to 950 nm.

5. The pattern printed sheet according to claim 1, wherein the transparent pattern has a peak selective reflection wavelength in the range of from 200 to 400 nm.

6. The pattern printed sheet according to claim 1, wherein the pattern printed sheet provides an information concerning a position of an input terminal capable of irradiating and detecting a non-visible light, on the pattern printed sheet, by reading a pattern reflected from the pattern printed sheet using the input terminal.

7. The pattern printed sheet according to claim 6, wherein the pattern printed sheet is fitted to a display device capable of displaying an image.

8. The pattern printed sheet according to claim 7, wherein the pattern printed sheet is disposed in an opposed relation to a front face of the display device.

9. The pattern printed sheet according to claim 6, wherein the pattern printed sheet is equipped with a fitting means for fitting the pattern printed sheet to the display device.

10. The pattern printed sheet according to claim 9, wherein the fitting means is provided on a contact surface of the pattern printed sheet where the sheet contacts the display device, and is constituted of an attaching member having a bonding property or an adhesion property for attaching the sheet to the display device.

11. The pattern printed sheet according to claim 1, wherein the pattern printed sheet is separable or dividable into a desired size.

12. The pattern printed sheet according to claim 1, wherein the dot pattern includes a patterned combination of dots having a plurality of shapes different from each other.

13. The pattern printed sheet according to claim 1, wherein the dot pattern has an arrangement of dots which are in an offset relation to reference points set in an equidistant relationship to each other in vertical and horizontal directions.

14. The pattern printed sheet according to claim 1, wherein the dot pattern is included in the multilayer structure.

15. The pattern printed sheet according to claim 1, wherein said non-visible light reflectance as measured at said peak selective reflection wavelength is 20 to 50%.

16. The pattern printed sheet according to claim 1, wherein each multilayer structure consists of said dot pattern and a rectangular pattern for measuring a reflectance.

17. The pattern printed sheet according to claim 1, wherein the chiral agent is in the form of a compound having an acrylate structure.

18. The pattern printed sheet according to claim 1, wherein the nematic liquid crystal includes a compound represented by formula (11).

19. The pattern printed sheet according to claim 1, wherein the chiral agent includes a compound represented by the following formula (12):

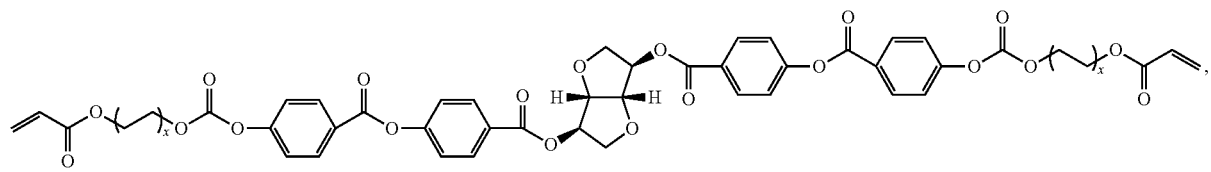

wherein X is a number from 2 to 5.

* * * * *